(12) United States Patent
Chen (10) Patent No.: US 10,479,374 B1
(45) Date of Patent: Nov. 19, 2019

(54) METHODS AND SYSTEMS FOR CUSTOMIZING VEHICLE CONNECTIONS OF OCCUPANTS EQUIPPED WITH WEARABLE DEVICES

(71) Applicant: HONDA MOTOR CO., LTD., Tokyo (JP)

(72) Inventor: Bonnie Hu Chen, Torrance, CA (US)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/962,801

(22) Filed: Apr. 25, 2018

(51) Int. Cl.
| | |
|---|---|
| B60W 50/00 | (2006.01) |
| B60W 50/08 | (2012.01) |
| G04G 21/02 | (2010.01) |
| G04G 21/04 | (2013.01) |

(52) U.S. Cl.
CPC ........ B60W 50/0098 (2013.01); B60W 50/08 (2013.01); B60W 2540/04 (2013.01); G04G 21/02 (2013.01); G04G 21/04 (2013.01)

(58) Field of Classification Search
None
See application file for complete search history.

(56) References Cited

U.S. PATENT DOCUMENTS

| | | | |
|---|---|---|---|
| 9,037,125 B1 | 5/2015 | Kadous | |
| 9,457,816 B2 * | 10/2016 | Van Wiemeersch | ........................ H04M 1/6075 |
| 9,760,698 B2 | 9/2017 | Pisz | |
| 2008/0174451 A1* | 7/2008 | Harrington | ............ G08B 21/06 340/905 |
| 2017/0082649 A1 | 3/2017 | Tu et al. | |
| 2017/0151918 A1* | 6/2017 | Boesen | .................. A61B 5/117 |
| 2018/0306568 A1* | 10/2018 | Holman | ................ G06F 3/0416 |
| 2019/0005412 A1* | 1/2019 | Matus | .................... G07C 5/085 |

OTHER PUBLICATIONS

Baranwal et al., "Real-Time Gesture-Based Communication Using Possibility Theory-Based Hidden Markov Model", Computational Intelligence, vol. 33, No. 4, 2017 (Year: 2017).*
Karatas, C. et al. "Leveraging Wearables for Steering and Driver Tracking" IEEE INFOCOM, IEEE International Conference, pp. 1-9, Apr. 2016.

* cited by examiner

Primary Examiner — Tamara L Weber
(74) Attorney, Agent, or Firm — Arent Fox LLP (57) ABSTRACT

Systems and methods for customizing connections to a vehicle of one or more occupants equipped with a wearable device. The system a memory that stores instructions for customizing connections to a vehicle of one or more occupants equipped with a wearable device. The system also includes a processor configured to execute the instructions. The instructions cause the processor to: detect one or more occupants of the vehicle equipped with a respective wearable device; determine a status of each of the one or more occupants equipped with the wearable device based on one or more motions; and customize the connections to the vehicle based on the status of each of the one or more occupants.

14 Claims, 5 Drawing Sheets

METHODS AND SYSTEMS FOR CUSTOMIZING VEHICLE CONNECTIONS OF OCCUPANTS EQUIPPED WITH WEARABLE DEVICES

TECHNICAL FIELD

The present disclosure relates to methods and systems for customizing vehicle connections of one or more occupants equipped with wearable devices.

BACKGROUND

Vehicles may detect occupants equipped with wearable devices based on an occupant's motions. For example, the motions may be gestures involving moving the steering wheel and opening/closing vehicle doors. In some instances, the motions may be used to determine whether an occupant equipped with the wearable device is driving the vehicle.

SUMMARY

This summary is provided to introduce a selection of concepts in a simplified form that are further described below in the DETAILED DESCRIPTION. This summary is not intended to identify key features of the claimed subject matter, nor is it intended to be used as an aid in determining the scope of the claimed subject matter.

In one aspect, the present disclosure is related to a system that includes a memory that stores instructions for executing processes that may customize connections to a vehicle of one or more occupants equipped with a wearable device. The system may also include a processor configured to execute the instructions. The instructions may cause the processor to: detect one or more occupants of the vehicle equipped with a respective wearable device; determine a status of each of the one or more occupants equipped with the wearable device based on one or more motions; and customize the connections to the vehicle based on the status of each of the one or more occupants.

In a further aspect, the present disclosure is related to a method for customizing connections to a vehicle of one or more occupants equipped with a wearable device. The method may include: detecting one or more occupants of the vehicle equipped with a respective wearable device; determining a status of each of the one or more occupants equipped with the wearable device based on one or more motions; and customizing the connections to the vehicle based on the status of each of the one or more occupants.

In a further aspect, the present disclosure is related to a non-transitory computer-readable storage medium containing executable computer program code. The code comprises instructions that may cause a processor to: detect one or more occupants of a vehicle equipped with a respective wearable device; determine a status of each of the one or more occupants equipped with the wearable device based on one or more motions; and customize connections to a vehicle based on the status of each of the one or more occupants. detect the one or more occupants in the vehicle, determine whether the one or more occupants is equipped with the wearable device based on one or more motions, and prioritize the connection to the vehicle of the one or more occupants equipped with the wearable device over an occupant without a wearable device.

BRIEF DESCRIPTION OF THE DRAWINGS

The novel features believed to be characteristic of aspects of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected," is one in which signals, physical communications, and/or logical communications may be sent and/or received. An operable connection may include a physical interface, a data interface and/or an electrical interface.

A "vehicle," as used herein, refers to any moving vehicle that is powered by any form of energy. A vehicle may carry human occupants or cargo. The term "vehicle" includes, but is not limited to: cars, trucks, vans, minivans, SUVs, motorcycles, scooters, boats, personal watercraft, and aircraft. In some cases, a motor vehicle includes one or more engines.

Figure 1:
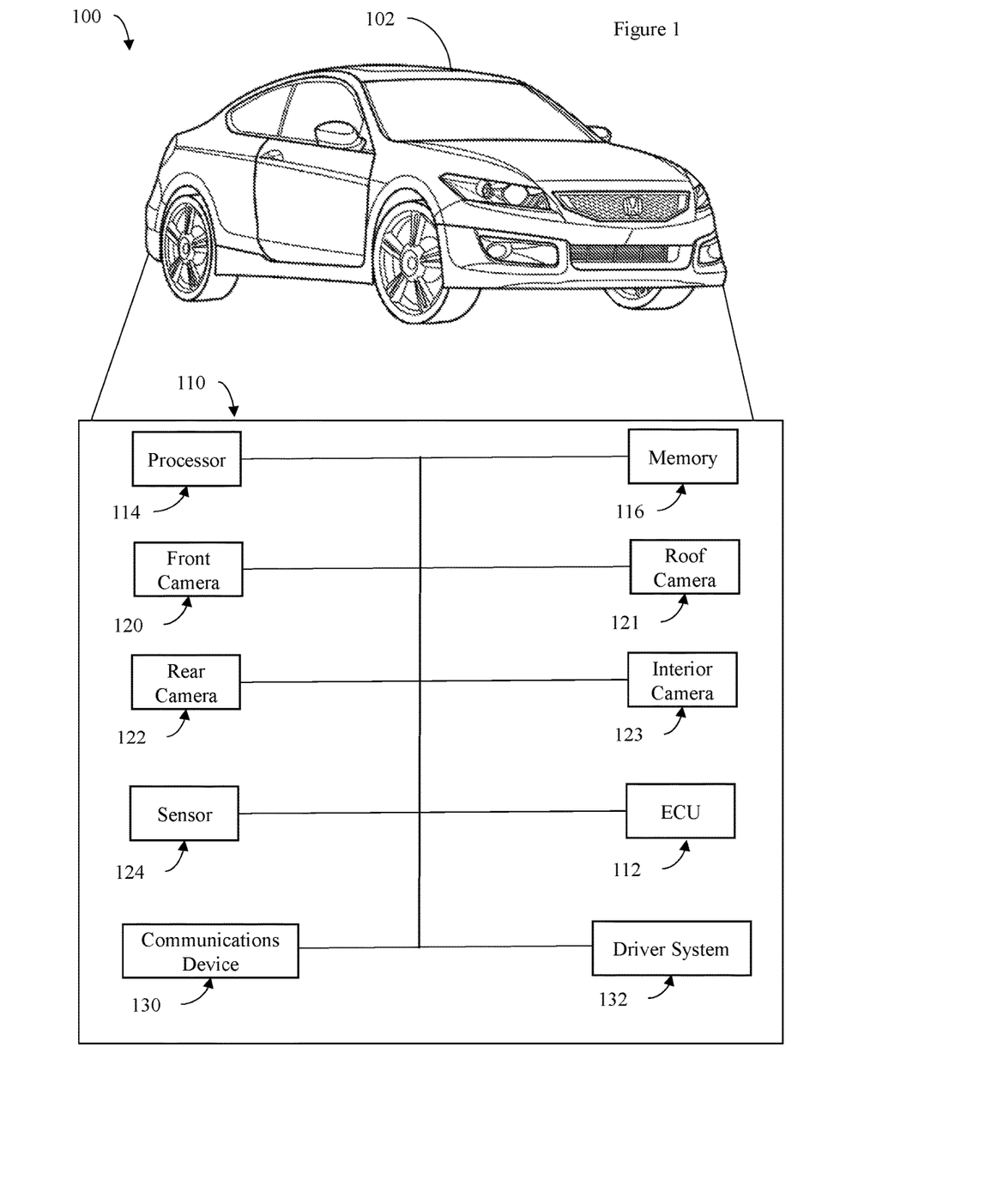
FIG. 1 illustrates a schematic view of an exemplary operating environment of a vehicle system in accordance with aspects of the present disclosure.

Generally described, the present disclosure provides systems and methods for customizing connections to a vehicle of one or more occupants equipped with a wearable device. Turning to FIG. 1, a schematic view of an exemplary operating environment 100 of a vehicle system 110 according to an aspect of the disclosure is provided. The vehicle system 110 may reside within a vehicle 102. The components of the vehicle system 110, as well as the components of other systems, hardware architectures, and software architectures discussed herein, may be combined, omitted or organized into various implementations.

The vehicle 102 may generally include an electronic control unit (ECU) 112 that operably controls a plurality of vehicle systems. The ECU 112 may include internal processing memory, an interface circuit, and bus lines for transferring data, sending commands, and communicating with the vehicle systems. The ECU 112 may include an internal processor and memory, not shown. The vehicle 102 may also include a bus for sending data internally among the various components of the vehicle system 110. The vehicle systems may include, but are not limited to, the vehicle system 110, among others, including vehicle HVAC systems, vehicle audio systems, vehicle video systems, vehicle infotainment systems, vehicle telephone systems, and the like.

The vehicle 102 may include a front camera 120, a roof camera 121, a rear camera 122, an interior camera 123, and/or a sensor 124. In some aspects, each of the front camera 120, roof camera 121, the rear camera 122, the interior camera 123, and/or the sensor 124 may be used for detecting the presence of one or more occupants in the vehicle 102.

The vehicle system 110 may also include a processor 114 and a memory 116 that communicate with a communications device 130 and a driving system 132. The communications device 130 (e.g., wireless modem) may provide wired or wireless computer communications utilizing various protocols to send/receive electronic signals internally with respect to features and systems within the vehicle 102 and with respect to external devices. For example, the communications device 130 may wirelessly communicate with the wearable device(s) equipped by the one or more occupants. Additionally, the communications device 130 may wirelessly communicate with a secondary device (e.g., a mobile phone, tablet, etc.) of at least one of the one or more occupants. These protocols may include a wireless system utilizing radio-frequency (RF) communications (e.g., IEEE 802.11 (Wi-Fi), IEEE 802.15.1 (Bluetooth®)), a near field communication system (NFC) (e.g., ISO 13157), a local area network (LAN), a wireless wide area network (WWAN) (e.g., cellular) and/or a point-to-point system. Additionally, the communications device 130 of the vehicle 102 may be operably connected for internal computer communication via a bus (e.g., a CAN or a LIN protocol bus) to facilitate data input and output between the electronic control unit 112 and vehicle features and systems. In an aspect, the communications device 130 may be configured for vehicle-to-vehicle (V2V) communications, vehicle-to-pedestrian (V2P) communications, and/or vehicle-to-anything (V2X) communications. For example, V2V, V2P, and V2X communications may include wireless communications over a reserved frequency spectrum. As another example, V2V, V2P, and V2X communications may include an ad hoc network between vehicles set up using Wi-Fi or Bluetooth®.

Figure 5:
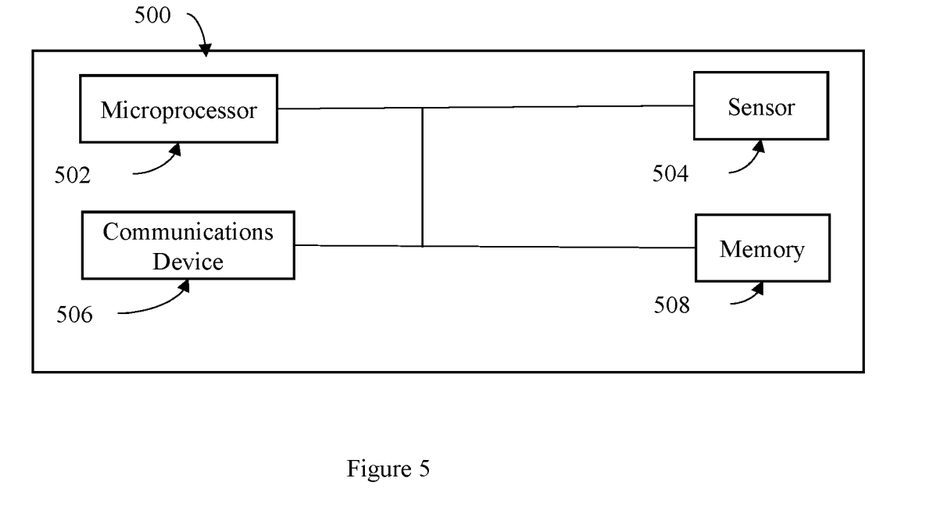
FIG. 5 illustrates a schematic view of an exemplary wearable device in accordance with aspects of the present disclosure.

In some aspects, the driver system 132 may detect one or more occupants equipped with a wearable device. For example, when door sensors of the vehicle 102 are activated, the vehicle 102 may collect information from the wearable device. The information collected from the wearable device may be used to identify a user profile associated with the wearable device. The wearable device may be, for example, device worn on a wrist, such as a watch, and as such, the driver system 132 may determine whether the one or more occupants is equipped with the wearable device based on detected hand motions. In some aspects, as shown in FIG. 5, a wearable device 500 may include one or more microprocessors 502, one or more sensors 504, a communications device 506, and a memory 508. The one or more sensors 504 of the wearable device 500 may include for example, an accelerometer, a gyroscope, a barometer or altimeter, a magnetometer or compass, among other sensors. The memory 508 may also store information related to an occupant equipped with the wearable device, which can be used by the vehicle 102 to identify the occupant. In some aspects, the wearable device 500 may communicate with the vehicle 102 via the communication device 506. For example, the wearable device 500 may transmit data collected by the one or more sensors and/or stored in the memory 508 to the vehicle 102. The data from the wearable device may include x-y-z accelerations/positions of the wearable device 500 as measured by the accelerometer and/or the gyroscope, respectively.

Using the data from the one or more sensors 504 of the wearable device, the driver system 132 may use machine learning algorithms to recognize one or more motions. For example, the driver system 132 may include a motion training tool to recognize the one or more motions, in addition to door opening/closing and steering wheel gestures, among others. In some aspects, the data received from the wearable devices may be provided to a Hidden Markov Model (HMM) algorithm to determine whether the one or more motions is an actionable item. In some aspects, the one or more motions may include a wrist rotation indicating that the vehicle 102 is being started, a hand movement indicating movement of a gear shifter, a hand movement indicating the fastening/unfastening of a seatbelt, a hand movement indicating adjustment of the mirrors, a hand movement indicating adjustment of the seat(s), and/or a hand movement indicating interaction with an infotainment system. By using the machine learning algorithms, the vehicle 102 may continuously be trained to identify additional motions. That is, using the motion training tool, the driver system 132 may recognize more and more motions over time, thereby enabling better detection of wearable devices in the future. In some aspects, the driver system 132 may also implement automatic gesture spotting based on information received from the wearable devices and use this information to recognize the one or more motions. This enhanced recognition of motions may enable the driver system 132 to tailor features of the vehicle 102 to each occupant based on the status of the occupant.

In some aspects, the driver system 132 may determine a status of each of the one or more occupants equipped with a respective wearable device. For example, the driver system 132 may determine the status of each of the one or more occupants based on the one more motions recognized by the motion training tool or based on instructions for recognizing the one or more motions received from a manufacturer system. In further aspects, the driver system 132 may customize connections to the vehicle based on the status of the one or more occupants. For example, the driver system 132 may distinguish between a driver of the vehicle 102 and one or more passengers. In some aspects, the driver system 132 may be able to identify the driver of the vehicle 102 based on motions that are unique to the driver, such as rotation of the steering wheel.

Based on this distinction, the driver system 132 may customize the connections to the vehicle, such that the driver's secondary device (e.g., mobile device) may be granted priority for making/receiving phone calls via the vehicle 102 over any other secondary devices in the vehicle 102. In some aspects, customizing connections to the vehicle may include prioritizing the driver's secondary device over other passengers' devices when bandwidth is constrained in the vehicle 102 by multiple secondary devices. In further aspects, when the driver's secondary device is prioritized over other secondary devices coupled to the vehicle 102, customizing connections to the vehicle may include enabling the other secondary devices to interact with the vehicle 102 for infotainment features. For example, the other secondary devices may interact with the vehicle to stream content, such as music and/or videos. In addition, in some aspects, customizing connections to the vehicle 102 may also include synchronizing the secondary devices of those occupants equipped with a respective wearable device based on the user profile associated with wearable device over secondary devices of occupants that are not equipped with a wearable device recognized by the vehicle 102.

Figure 2:
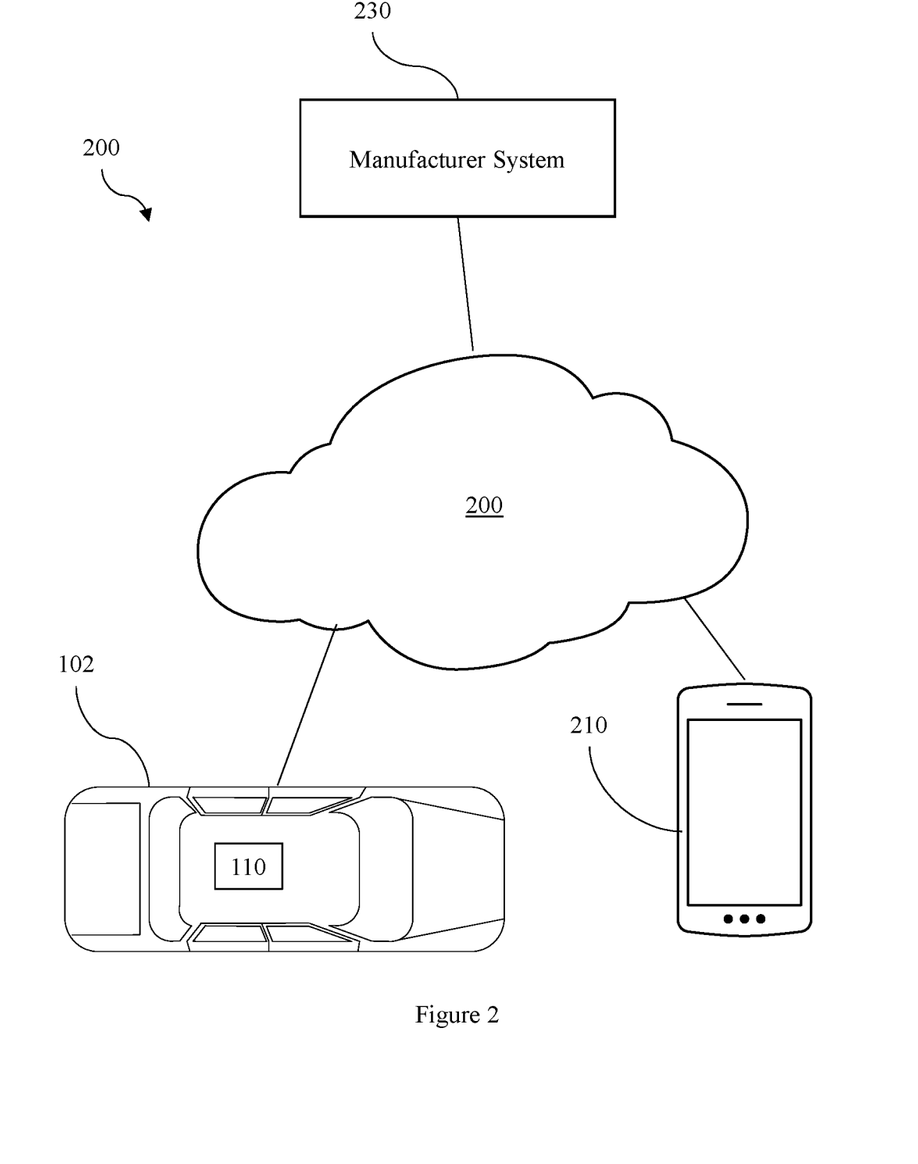
FIG. 2 illustrates an exemplary network for managing the vehicle system in accordance with aspects of the present disclosure.

FIG. 2 illustrates an exemplary network 200 for managing the vehicle system 110. The network 200 may be a communications network that facilitates communications between multiple systems. For example, the network 200 may include the Internet or another Internet Protocol (IP) based network. The network 200 may enable the vehicle system 110 to communicate with a mobile device 210 (e.g., a secondary device) or a manufacturer system 230. The manufacturer system 230, mobile device 210, and driving system 132 may include a computer system, as shown with respect to FIG. 3 described below. For example, the manufacturer system 230 may also include a memory that stores instructions for executing processes for generating instructions to recognize the one or more motions, in addition to door opening/closing and steering wheel gestures, and a processor configured to execute the instructions.

For example, in some aspects, the vehicle 102 may transmit the data collected from the wearable device(s) to the manufacturer system 230, and the motion training tool may reside on the manufacturer system 230. In this way, the manufacturer system 230 may be trained to recognize the one or more motions in a similar manner as described with respect to the vehicle 102, and the manufacturer system 230 may generate instructions for recognizing the one or more motions. For example, the one or more motions may include a wrist rotation indicating that the vehicle 102 is being started, a hand movement indicating movement of a gear shifter, a hand movement indicating the fastening/unfastening of a seatbelt, a hand movement indicating adjustment of the mirrors, a hand movement indicating adjustment of the seat(s), and/or a hand movement indicating interaction with an infotainment system. Additionally, in some aspects, the manufacturer system 230 may distribute the instructions for recognizing the one or more motions to a plurality of vehicles 102 over the network 200.

Figure 3:
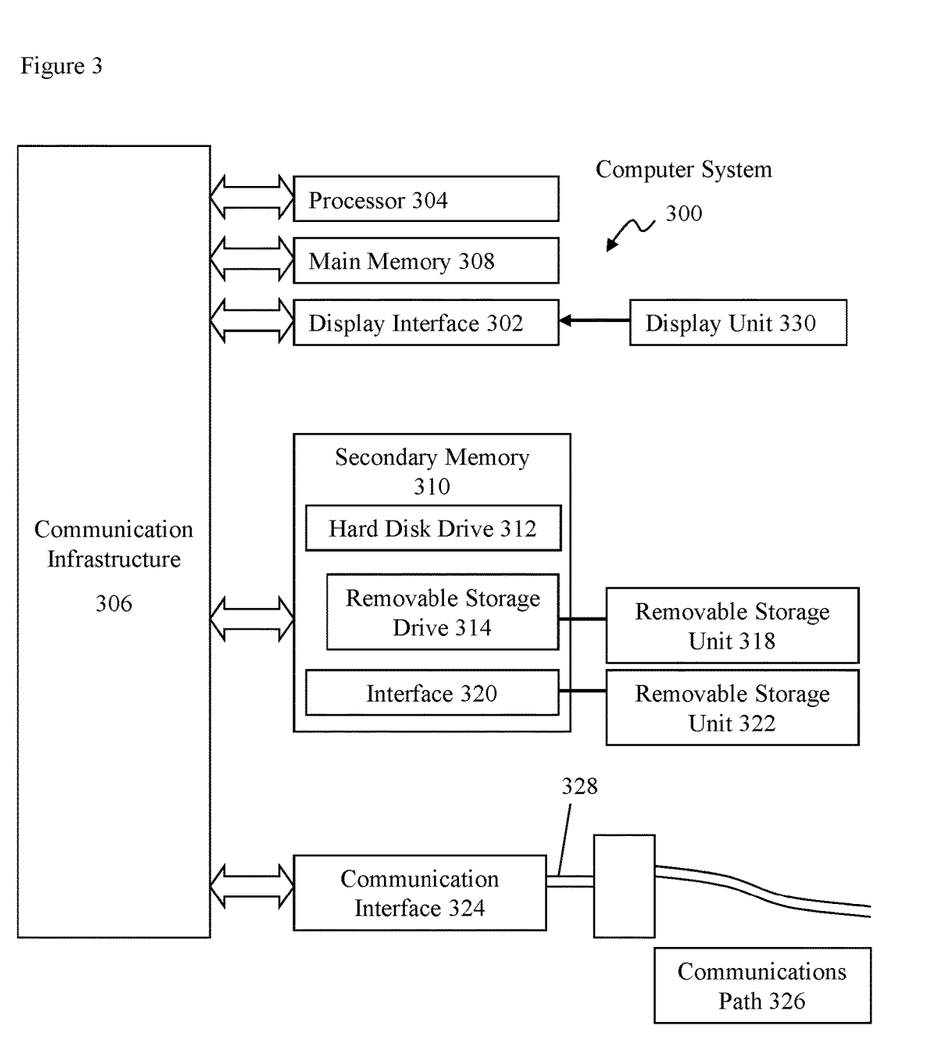
FIG. 3 illustrates various features of an exemplary computer system for use in conjunction with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 300 is shown in FIG. 3.

Computer system 300 includes one or more processors, such as processor 304. The processor 304 is connected to a communication infrastructure 306 (e.g., a communications bus, cross-over bar, or network). Various software aspects are described in terms of this example computer system. After reading this description, it will become apparent to a person skilled in the relevant art(s) how to implement aspects of the disclosure using other computer systems and/or architectures.

Computer system 300 may include a display interface 302 that forwards graphics, text, and other data from the communication infrastructure 306 (or from a frame buffer not shown) for display on a display unit 330. Computer system 300 also includes a main memory 308, preferably random access memory (RAM), and may also include a secondary memory 310. The secondary memory 310 may include, for example, a hard disk drive 312, and/or a removable storage drive 314, representing a floppy disk drive, a magnetic tape drive, an optical disk drive, a universal serial bus (USB) flash drive, etc. The removable storage drive 314 reads from and/or writes to a removable storage unit 318 in a well-known manner. Removable storage unit 318 represents a floppy disk, magnetic tape, optical disk, USB flash drive etc., which is read by and written to removable storage drive 314. As will be appreciated, the removable storage unit 318 includes a computer usable storage medium having stored therein computer software and/or data.

Alternative aspects of the present disclosure may include secondary memory 310 and may include other similar devices for allowing computer programs or other instructions to be loaded into computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to computer system 300.

Computer system 300 may also include a communications interface 324. Communications interface 324 allows software and data to be transferred between computer system 300 and external devices. Examples of communications interface 324 may include a modem, a network interface (such as an Ethernet card), a communications port, a Personal Computer Memory Card International Association (PCMCIA) slot and card, etc. Software and data transferred via communications interface 324 are in the form of signals 328, which may be electronic, electromagnetic, optical or other signals capable of being received by communications interface 324. These signals 328 are provided to communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 318, a hard disk installed in hard disk drive 312, and signals 328. These computer program products provide software to the computer system 300. Aspects of the present disclosure are directed to such computer program products.

Computer programs (also referred to as computer control logic) are stored in main memory 308 and/or secondary memory 310. Computer programs may also be received via communications interface 324. Such computer programs, when executed, enable the computer system 300 to perform the features in accordance with aspects of the present disclosure, as discussed herein. In particular, the computer programs, when executed, enable the processor 304 to perform the features in accordance with aspects of the present disclosure. Accordingly, such computer programs represent controllers of the computer system 300.

In an aspect of the present disclosure where the disclosure is implemented using software, the software may be stored in a computer program product and loaded into computer system 300 using removable storage drive 314, hard drive 312, or communications interface 320. The control logic (software), when executed by the processor 304, causes the processor 304 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 4:
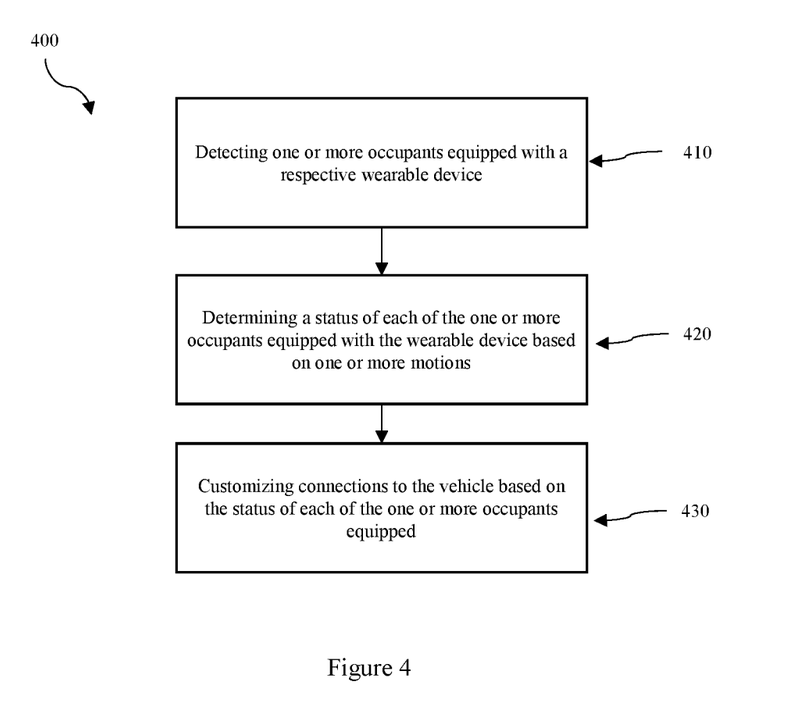
FIG. 4 illustrates an exemplary flowchart for customizing connections to a vehicle of one or more occupants equipped with a wearable device, according to aspects of the present disclosure.

FIG. 4 illustrates a flowchart for customizing connections to a vehicle of one or more occupants that is equipped with a wearable device. In some aspects, the method may include detecting one or more occupants equipped with a respective wearable device 410. For example, when door sensors of the vehicle are activated, the vehicle may collect information from the wearable device, which may be used to identify a user profile associated with the wearable device. The method may further include determining a status of each of the one or more occupants equipped with the wearable device based on one or more motions 420. In some aspects, the one or more motions comprise at least one of a wrist rotation indicating that the vehicle is being started, a hand movement indicating movement of a gear shifter, a hand movement indicating fastening or unfastening of a seatbelt of the vehicle, a hand movement indicating adjustment of mirrors of the vehicle, a hand movement indicating adjustment of a seat of the vehicle, and a hand movement indicating interaction with an infotainment system of the vehicle. The method may also include customizing connections to the vehicle based on the status of each of the one or more occupants. For example, the method may include distinguishing between a driver of the vehicle and one or more passengers based on motions that are unique to the driver. Based on this distinction, customizing the connections to the vehicle may include granting priority to the driver's secondary device for making/receiving phone calls via the vehicle over any other secondary devices in the vehicle. In some aspects, customizing connections to the vehicle may include prioritizing the driver's secondary device over other passengers' devices when bandwidth is constrained in the vehicle by multiple secondary devices. In further aspects, when the driver's secondary device is prioritized over other secondary devices coupled to the vehicle, customizing connections to the vehicle may include enabling the other secondary devices to interact with the vehicle for infotainment features. For example, the other secondary devices may interact with the vehicle to stream content, such as music and/or videos. In addition, in some aspects, customizing connections to the vehicle may also include synchronizing the secondary devices of those occupants equipped with a respective wearable device based on the user profile associated with wearable device over secondary devices of occupants that are not equipped with a wearable device recognized by the vehicle.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A system comprising:
a memory that stores instructions for customizing connections to a vehicle of one or more occupants equipped with a wearable device; and
a processor configured to execute the instructions, wherein the instructions cause the processor to:
detect one or more occupants of the vehicle equipped with a respective wearable device;
determine a status of each of the one or more occupants equipped with the wearable device based on one or more motions;
distinguish between a driver of the vehicle and one or more passengers of the vehicle; and
customize the connections to the vehicle based on the status of each of the one or more occupants by prioritizing a secondary device of the driver equipped with the wearable device over other secondary devices in the vehicle.

2. The system of claim 1, wherein the one or more motions comprise at least one of a wrist rotation indicating that the vehicle is being started, a hand movement indicating movement of a gear shifter, a hand movement indicating fastening or unfastening of a seatbelt of the vehicle, a hand movement indicating adjustment of mirrors of the vehicle, a hand movement indicating adjustment of a seat of the vehicle, and a hand movement indicating interaction with an infotainment system of the vehicle, or a combination thereof.

3. The system of claim 1, wherein the wearable device is a watch.

4. The system of claim 1, wherein, when the secondary device of the driver is prioritized over the other secondary devices, the instructions further cause the processor to enable the other secondary devices to interact with the vehicle for entertainment features.

5. The system of claim 1, wherein customizing the connections to the vehicle comprises synchronizing secondary devices of one or more occupants equipped with respective wearable devices over secondary devices of occupants that are not equipped with a wearable device recognized by the vehicle.

6. A method for customizing connections to a vehicle of one or more occupants equipped with a wearable device comprising:
detecting one or more occupants of the vehicle equipped with a respective wearable device;
determining a status of each of the one or more occupants equipped with the wearable device based on one or more motions;
distinguishing between a driver of the vehicle and one or more passengers of the vehicle; and customizing the connections to the vehicle based on the status of each of the one or more occupants by prioritizing a secondary device of the driver equipped with the wearable device over other secondary devices in the vehicle.

7. The method of claim 6, wherein the one or more motions comprise at least one of a wrist rotation indicating that the vehicle is being started, a hand movement indicating movement of a gear shifter, a hand movement indicating fastening or unfastening of a seatbelt of the vehicle, a hand movement indicating adjustment of mirrors of the vehicle, a hand movement indicating adjustment of a seat of the vehicle, and a hand movement indicating interaction with an infotainment system of the vehicle, or a combination thereof.

8. The method of claim 6, wherein the wearable device is a watch.

9. The method of claim 6, wherein, when the secondary device of the driver is prioritized over the other secondary devices, the method further comprises enabling the other secondary devices to interact with the vehicle for entertainment features.

10. The method of claim 6, wherein customizing the connections to the vehicle comprises synchronizing secondary devices of one or more occupants equipped with respective wearable devices over secondary devices of occupants that are not equipped with a wearable device recognized by the vehicle.

11. A non-transitory computer-readable storage medium containing executable computer program code, the code comprising instructions configured to cause a processor to:

detect one or more occupants of a vehicle equipped with a respective wearable device;

determine a status of each of the one or more occupants equipped with the wearable device based on one or more motions;

distinguish between a driver of the vehicle and one or more passengers of the vehicle; and customize connections to the vehicle based on the status of each of the one or more occupants by prioritizing a secondary device of the driver equipped with the wearable device over other secondary devices in the vehicle.

12. The medium of claim 11, wherein the one or more motions comprise at least one of a wrist rotation indicating that the vehicle is being started, a hand movement indicating movement of a gear shifter, a hand movement indicating fastening or unfastening of a seatbelt of the vehicle, a hand movement indicating adjustment of mirrors of the vehicle, a hand movement indicating adjustment of a seat of the vehicle, and a hand movement indicating interaction with an infotainment system of the vehicle, or a combination thereof.

13. The medium of claim 11, wherein, when the secondary device of the driver is prioritized over the other secondary devices, the code further causes the processor to enable the other secondary devices to interact with the vehicle for entertainment features.

14. The medium of claim 11, wherein customizing the connections to the vehicle comprises synchronizing secondary devices of one or more occupants equipped with respective wearable devices over secondary devices of occupants that are not equipped with a wearable device.

* * * * *